United States Patent Office 3,095,312
Patented June 25, 1963

3,095,312
POROUS FOAMED SILICATE PRODUCTS
Sidney T. Holmes, 1410 Warrington Road, Deerfield, Ill.
No Drawing. Filed Dec. 24, 1959, Ser. No. 861,739
2 Claims. (Cl. 106—75)

This invention deals with the production of inexpensive, essentially inorganic, foamed products formed by expanding a mixture into a hard porous mass suitable for a variety of important uses. More specifically, it relates to foamed masses produced by interaction at ambient temperatures of water-soluble inorganic silicates with gas-producing peroxy compounds, generally in presence of powdered inorganic fillers, and found suitable for use as foamed-in-place insulation and in other valuable outlets.

In the case of thermal insulation, for example, industrial usage thereof for many years has been limited because of the difficulty of shaping the commercially available solid materials to fit the specific needs involved. Until recently, such insulation was available only in the form of powder, sheet (flexible and rigid), and block. Accordingly, it was necessary to fabricate (shape) the material to the desired form for the particular application. This led to the unfortunate results that high labor costs would be involved and that the efficiency of the insulation would not be at its optimum due to the inherent difficulty in fitting closely the product to be insulated.

In the past few years, light-weight foamed-in-place insulation became available and it was received enthusiastically by industry because of its many advantages. Unfortunately, these rather expensive foamed products have been composed of organic materials which necessarily limit their usage to low operating temperatures. Also, they require control of the reaction composition to rather narrow limits, and usually heat has been necessary to generate the gas from the "blowing" agent in the production of such foamed masses. These temperature limitations and installation difficulties under industrial conditions have emphasized the need for a simple, light-weight, foamed-in-place product which would be resistant to heat and would not require external heating for the foaming reaction.

According to the present invention, there is produced an essentially inorganic foamed-in-place (or in-situ foamed) product suitable for use at elevated temperatures, which is competitive price-wise even with the archaic powder, sheet, or block type of material.

The first ingredient in the composition of the present invention is the gas-producing agent, which is a peroxy compound, i.e., a compound capable of liberating gaseous oxygen. Particularly effective, are the water-soluble peroxy compounds such as alkali metal peroxide, alkali metal perborate, urea, hydrogen peroxide, calcium permanganate, and similar compounds.

The second ingredient is a water-soluble inorganic silicate, serving (in finished form) as the skeletal structure and as the adhesive compound to bind the filler (when used) in the foamed mass. This ingredient is employed in powder or liquid form, as will be explained further, and it is the proportion of this component in relation to the third ingredient, which determines whether the resulting foam will be water-soluble or water-insoluble. Particularly effective, are the alkali metal silicates, such as those of sodium, potassium and lithium.

The third ingredient, which may be omitted in certain special cases (i.e., in water-soluble products where foaming time duration is unimportant), as will be explained further, is paraformaldehyde. It appears to act in a catalytic manner, both to promote insolubility and to accelerate the foaming reaction. In the case where sodium silicate is used together with paraformaldehyde, there is a critical weight ratio of concentration necessary to produce a water-insoluble foamed product. This ratio is the portion of total $Na_2O$ to paraformaldehyde used, which should be less than 3 to 1, and preferably less than 2 to 1. It is apparent that, when metals other than sodium are used in the silicate, the ratio figures must be adjusted accordingly. At the same time, the total amount of paraformaldehyde present, by weight, in the reaction mixture, should be less than 5% and preferably 3% or less, such as between about 0.1% and 2%. This paraformaldehyde, in addition to promoting water-insolubility, also acts to trigger the expansion of the reaction mixture in certain cases, as well as to accelerate the foaming rate.

The fourth ingredient, which, though not necessary in the water-soluble products, is of importance in the insoluble products, is a filler, preferably an inorganic and generally an inert refractory material such as alumina, magnesia, asbestos, spar, silica, lime, fireclay, graphite or combination thereof. It is usually employed in powdered form, preferably as a flour of 200 mesh or finer, in amounts of about 0.1% by weight up to 20%, 30%, 40% or 50% or more of the composition.

The reaction of the present invention may be controlled to produce a water-soluble or water-insoluble solid foamed product, as desired. The in-situ foaming causes an increase in volume of the mixture, following which a hardening of the foam occurs. Roughly, an increase in volume of 3 to 1 results in forming a solidified foam of density of about 40 lb./cu. ft., while an increase of 6 to 1 results with a product density of about 18 lb./cu. ft.

The reaction mixture to produce a water-soluble hardened foam product contains a peroxy compound, and both liquid water-soluble and powdered water-soluble silicate. Paraformaldehyde may be added to accelerate the foaming reaction. Without this latter ingredient, complete foaming takes from 10 to 24 hours with no appreciable evolution of heat, while with the ingredient in amounts of from 1% to 5%, foaming takes place in from 5 to 60 minutes, with some evolution of heat. The product thus formed is water-soluble if the weight ratio of $Na_2O$ (of the silicate) to paraformaldehyde used is greater than 3 to 1. Density of the foamed product may be controlled to be from 10 to 30 lb./cu. ft., depending upon the proportions of the ingredients and the amount of paraformaldehyde used.

In the preparation of a water-soluble hardened foamed product, a liquid comprising about 5 to 20 parts by weight of a water-soluble liquid peroxy compound and 30 to 70 parts by weight of a liquid water-soluble silicate, is mixed with about 10 to 65 parts by weight of powdered water-soluble silicate. It is generally desirable to add about 1 to 5 parts by weight of paraformaldehyde to accelerate the foaming rate. The liquid portion is mixed with the powder, then the slurry is stirred until smooth and creamy, and it is poured into the cavity to be filled. No further processing is required.

To illustrate the effect of various ingredients on the properties of the foamed product, the following examples are submitted:

| Material | Example Number | | |
|---|---|---|---|
| | 1 | 2 | 3 |
| Sodium Silicate (Powdered) ("G" Brand—1.0 $Na_2O$:3.22 $SiO_2$), percent by weight | 45 | 43 | 45 |
| Paraformaldehyde (Powdered), percent by weight | 0 | 2 | 0 |
| Hydrogen Peroxide (30% Aqueous), percent by weight | 10 | 10 | 5 |
| Sodium Silicate (Liquid) ("N" Brand 1.0 $Na_2O$:3.22 $SiO_2$), percent by weight | 45 | 45 | 50 |
| Density of foamed product, lb./cu. ft. | 18 | 40 | (¹) |
| Water Solubility | (²) | Soluble | None |
| Ratio of $Na_2O$/Paraformaldehyde | Infinite | 6–1 | Infinite |

¹ No foaming.   ² Very soluble.

The product of Example 1 has a uniform multicellular structure, and is readily soluble in water, resistant to flame impingement and capable of withstanding continual exposure of at least 10 minutes to temperatures of up to 1200° F. The product of Example 2 (to which mixture paraformaldehyde was added to accelerate the rate of foaming) possesses the same properties except that the structure of the material is coarse, and the product shrinks on solidifying. Example 3 illustrates the fact that the peroxy compound is essential to foam production. Without it, the mixture does not expand upon reaction.

Such water-soluble solidified foam products made in accordance with the present invention have a number of important uses, such as in making temporary molds for plastic boat hulls, and for other similar purposes wherein an empty cavity is desired upon completion of the plastic or other type of article to be made (wherein the solid foam is leached out with water). The low cost of such foams makes them expendable.

There are two types of water-insoluble foams which may be prepared in accordance with the present invention. The first type involves use of a powder mixture of a peroxy compound, paraformaldehyde (which is essential to this type of foam) and an inert inorganic filler, which powder then is admixed with a liquid water-soluble inorganic silicate. The product produced by interaction of these ingredients is a water-insoluble foam (the ratio of $Na_2O$ to paraformaldehyde in this case being less than 3 to 1). Densities of the solid products vary from about 20 to 50 lbs./cu. ft. Sufficient paraformaldehyde is employed so that foaming occurs rapidly in about 5 to 60 minutes after the initial mixing, with slight evolution of heat.

In the preparation of such water-insoluble solid foams, a powder is mixed comprising about 5 to 30 parts by weight of a solid peroxy compound, about 1 to 5 parts of paraformaldehyde, and about 20 to 50 parts by weight of an inert inorganic filler. Then, this powder is mixed with about 15 to 75 parts by weight of a liquid, water-soluble inorganic silicate. This reaction mixture is stirred until it is smooth and creamy, and it is then poured into the cavity to be filled.

No further processing is required.

To illustrate the effects of various ingredients on the properties of the foamed product, the following examples are submitted:

| Material | Example Number | | | | |
|---|---|---|---|---|---|
| | 4 | 5 | 6 | 7 | 8 |
| Silica Flour (200+ mesh), percent by weight | 30 | 32 | 0 | 33 | 46 |
| Paraformaldehyde (Powdered), percent by weight | 3 | 1 | 3 | 0 | 3 |
| Sodium Perborate (Powdered), percent by weight | 16 | 16 | 16 | 16 | 0 |
| Sodium Silicate (Liquid) ("N" Brand 1.0 $Na_2O$:3.22 $SiO_2$), percent by weight | 51 | 51 | 81 | 51 | 51 |
| Density of Foamed Product, lb./cu. ft. | 36 | 45 | 40 | (¹) | (²) |
| Water Solubility | None | Soluble | Slight | | |
| Ratio of $Na_2O$/Paraformaldehyde | 1.5 | 4.6 | 2.4 | | |

¹ Little foam.  ² No foam.

The product from Example 4 has a uniform multicellular structure. It is insoluble in water, is resistant to flame impingement, and is capable of withstanding continual exposure of at least 10 minutes to temperatures of up to 1200° F. The product from Example 5 has similar properties, but it is soluble in water, as is evidenced by the ratio of $Na_2O$/paraformaldehyde. The product from Example 6 has similar, but somewhat less refractory properties, higher density and only slight solubility in water. The $Na_2O$/paraformaldehyde ratio of 2.4/1 is a borderline value with respect to water solubility. Examples 7 and 8 illustrate the need for both paraformaldehyde and peroxy compounds to cause full foaming.

The second type of water-insoluble foamed product made in accordance with this invention involves use of a reaction mixture comprising a powder mixture of paraformaldehyde (essential to this type of foam) and an inert organic filler. This powder is admixed with an aqueous liquid comprising a peroxy compound, also a liquid water-soluble inorganic silicate, and water. The prepared powder mixture is combined with the aqueous mixture of peroxy compound and water and the resulting paste is finally mixed with the liquid water-soluble silicate. The foamed product resulting from the reaction is water-insoluble (the ratio of $Na_2O$ to paraformaldehyde being less than 3 to 1), and its density can vary from 20 to 50 lb./cu. ft. Foaming time may be made to take place in about 5 to 60 minutes after the initial mixing (with slight evolution of heat) by control of the amount of paraformaldehyde used.

In the preparation of such water-insoluble foam, a powder comprising about 1 to 5 parts by weight of paraformaldehyde and about 20 to 50 parts by weight of an inert inorganic filler is mixed with a liquid comprising about 5 to 15 parts by weight of liquid peroxy compound and 5 to 15 parts by weight of water, and the resulting paste is further mixed with about 15 to 70 parts by weight of a liquid water-soluble silicate. The final reaction slurry then is poured into the cavity to be filled and no further processing is required.

To illustrate the effects of the various ingredients on the properties of the foamed product, the following examples are submitted:

| Material | Example Number | | | |
|---|---|---|---|---|
| | 9 | 10 | 11 | 12 |
| Silica Flour (200+ mesh), percent by weight | 40 | 43 | 40 | 0 |
| Paraformaldehyde (Powdered), percent by weight | 3 | 0 | 3 | 3 |
| Hydrogen Peroxide (30%), percent by weight | 8 | 8 | 0 | 8 |
| Water, percent by weight | 7 | 7 | 15 | 7 |
| Sodium Silicate (Liquid), (9% $Na_2O$), "N" Brand 1.0 $Na_2O$:3.22 $SiO_2$), percent by weight | 42 | 42 | 42 | 82 |
| Density of Foamed Product, lb./cu. ft. | 40 | (¹) | (²) | (¹) |
| Water Solubility | None | | | |
| Ratio of $Na_2O$/paraformaldehyde | 1.26 | | | |

¹ Little foam.  ² No foam.

The product obtained from Example 9 has a uniform multicellular structure. It is insoluble in water, is resistant to flame impingement and is capable of withstanding continual exposure of at least ½ hour to temperatures of up to 1400° F. Examples 10 and 11 illustrate the interdependence of paraformaldehyde and peroxy compound to promote full foaming. Example 12 shows the need for solid filler to be utilized in order to form a rigid fully foamed product.

All of the aforesaid three types of foamed products (one soluble and the two insoluble) are readily repairable or "weldable" by addition of foam slurry (e.g., the mixture before setting) to any defect and/or cavity which requires subsequent filling. Such "repairs" form a contiguous, adherent structure that maintains the essential characteristics of the initial foam.

Another facet of this invention is the substitution of some or all of the inert organic fillers mentioned in the examples, by use of an oxidizable powdered solid, such as graphite, carbon, wood flour, etc., which may be burned to produce an exothermic reaction. Such an exothermic reagent has utility in the field of "hot topping" of metal ingots; i.e., use as a monolithic foam in place of fabricated refractory forms used to provide heat to cast metal bodies for feeding shrinkage cavities.

It will be noted that, among the other advantages of the present solidified foam material over prior art materials, there are included low cost, ease of preparation, lack of corrosive properties, no need for external heat, high operating temperatures, light-weight, excellent cavity-filling properties, shock resistance, and excellent insulation properties. Furthermore, it is possible to foam additional material on to already-foamed solid so that the two become welded into a monolithic mass of high tenacity. This is of importance in repair work where cavities and broken parts require mending with additional foam.

The foams of the present invention have advantages in filling cavities to be insulated against heat, cold, or sound, and in providing intimate contact for more efficient insulation as compared to the fitted types. Also, the foam may be generated in flab slab forms or as molds for the production of acoustical panels for ceilings and similar uses.

The reactions involved in the preparation of the foam are not clearly understood, but it is believed that the expansion element is oxygen, the source of which is the peroxy compound. The paraformaldehyde is believed to be decomposed or volatilized in the reaction, so that the final product consists mainly of hardened silicate and filler (if used), which are the essential ingredients of the finished hardened foam product.

Other materials which may be added to the powder or liquid ingredients, or to both, prior to foaming, include other exothermic reagents, soluble dyes, pigments, reflective ingredients, such as aluminum and magnesium flakes or powder, and the like.

I claim:
1. A process for producing a water-insoluble light rigid porous rapidly-foamed product having a multicellular structure consisting essentially of mixing together in an aqueous medium at ambient temperature about 1 to 20 parts by weight of a gas-producing peroxy compound, about 30 to 135 parts of water-soluble inorganic silicate, and about 1 to 5 parts of paraformaldehyde, while maintaining a silicate/aldehyde weight ratio between about 1.26 to about 2.4 (expressed as $Na_2O$/paraformaldehyde).

2. A process according to claim 1 in which up to 50 parts of an insoluble filler is added to the reaction mixture.

References Cited in the file of this patent

UNITED STATES PATENTS

| | | |
|---|---|---|
| 1,832,752 | Thoretz | Nov. 17, 1931 |
| 1,944,008 | Hobart | Jan. 16, 1934 |
| 2,018,632 | Boller | Oct. 22, 1935 |
| 2,117,605 | Fowler | May 17, 1938 |
| 2,234,646 | Humphries | Mar. 11, 1941 |
| 2,284,400 | Llewellyn et al. | May 26, 1942 |
| 2,921,357 | Fujii et al. | June 19, 1960 |
| 2,988,454 | Aberegg | June 13, 1961 |

FOREIGN PATENTS

| | | |
|---|---|---|
| 399,367 | Great Britain | Oct. 5, 1933 |

OTHER REFERENCES

Mellor: "A Comprehensive Treatise on Inorganic and Theoretical Chemistry," publ. 1925, Longmans Green & Co., London, vol. VI, page 334.